United States Patent
Shodai et al.

(10) Patent No.: US 12,126,031 B2
(45) Date of Patent: Oct. 22, 2024

(54) SUPPORTED PLATINUM CATALYST, CATHODE FOR FUEL CELL, FUEL CELL, AND METHOD FOR PRODUCING SUPPORTED PLATINUM CATALYST

(71) Applicant: TOYO TANSO CO., LTD., Osaka (JP)

(72) Inventors: Yoshio Shodai, Osaka (JP); Mizuho Anzai, Osaka (JP)

(73) Assignee: TOYO TANSO CO., LTD., Osaka (JP)

( * ) Notice: Subject to any disclaimer, the term of this patent is extended or adjusted under 35 U.S.C. 154(b) by 393 days.

(21) Appl. No.: 17/615,830

(22) PCT Filed: Jun. 3, 2020

(86) PCT No.: PCT/JP2020/021869
§ 371 (c)(1),
(2) Date: Dec. 2, 2021

(87) PCT Pub. No.: WO2020/246491
PCT Pub. Date: Dec. 10, 2020

(65) Prior Publication Data
US 2022/0328846 A1 Oct. 13, 2022

(30) Foreign Application Priority Data
Jun. 3, 2019 (JP) ................ 2019-103749

(51) Int. Cl.
*H01M 4/92* (2006.01)
*H01M 4/86* (2006.01)
*H01M 4/88* (2006.01)

(52) U.S. Cl.
CPC .......... H01M 4/926 (2013.01); H01M 4/8605 (2013.01); H01M 4/8828 (2013.01); *H01M 2004/8689* (2013.01)

(58) Field of Classification Search
CPC ...... H01M 4/926; H01M 4/925; H01M 4/921; H01M 4/8605; H01M 4/8621; H01M 4/8828; H01M 4/8825; H01M 4/8842; H01M 8/1004; H01M 2004/8689
See application file for complete search history.

(56) References Cited

U.S. PATENT DOCUMENTS

| | | | |
|---|---|---|---|
| 4,564,702 A | 1/1986 | Wennerberg | |
| 2006/0134506 A1 | 6/2006 | Kim et al. | |
| 2013/0330504 A1 | 12/2013 | Morishita et al. | |
| 2014/0106256 A1 | 4/2014 | Kim et al. | |
| 2016/0329571 A1* | 11/2016 | Matsumoto | B01J 31/28 |
| 2017/0098834 A1* | 4/2017 | Takeguchi | B82Y 30/00 |
| 2017/0200956 A1* | 7/2017 | Nagami | H01M 4/926 |
| 2020/0055026 A1 | 2/2020 | Ijima et al. | |

FOREIGN PATENT DOCUMENTS

EP 2959970 12/2015

OTHER PUBLICATIONS

K. Honda et al., "Electrochemical properties of Pt-modified nano-honeycomb diamond electrodes", Journal of Electroanalytical Chemistry, Nov. 2001, pp. 35-50.
"Office Action of China Counterpart Application", issued on Feb. 6, 2024, with English translation thereof, pp. 1-23.
"Search Report of Europe Counterpart Application", issued on May 24, 2023, pp. 1-8.
Minoru Inaba et al., "Structure-Controlled Pt Catalyst for Polymer Electrolyte Fuel Cells," Surface Science, vol. 32, No. 11, Sep. 2011, pp. 1-27.
"International Search Report (Form PCT/ISA/210) of PCT/JP2020/021869," mailed on Aug. 25, 2020, with English translation thereof, pp. 1-4.
"International Preliminary Report on Patentability(Form PCT/IB/373) of PCT/JP2020/021869," issued on Dec. 7, 2021, with English translation thereof, pp. 1-8.

* cited by examiner

Primary Examiner — Raymond Alejandro
(74) Attorney, Agent, or Firm — JCIPRNET

(57) ABSTRACT

A supported platinum catalyst having a high ratio of a diffraction peak intensity of a Pt (220) plane and having excellent oxidation resistance, obtained by a simple production method without using a polymer. The supported platinum catalyst includes a carbon support and platinum fine particles supported on the carbon support, the platinum fine particles being such that a ratio of a diffraction peak intensity of a (220) plane with respect to a total of diffraction peak intensities of a (111) plane, a (200) plane, and the (220) plane by X-ray diffraction is not less than 0.128.

16 Claims, 5 Drawing Sheets

SUPPORTED PLATINUM CATALYST, CATHODE FOR FUEL CELL, FUEL CELL, AND METHOD FOR PRODUCING SUPPORTED PLATINUM CATALYST

CROSS-REFERENCE TO RELATED APPLICATION

This application is a 371 application of the international PCT application serial no. PCT/JP2020/021869, filed on Jun. 3, 2020, which claims the priority benefit of Japan application no. 2019-103749, filed on Jun. 3, 2019. The entirety of each of the above-mentioned patent applications is hereby incorporated by reference herein and made a part of this specification.

TECHNICAL FIELD

The present invention relates to a supported platinum catalyst, a cathode for a fuel cell, a fuel cell, and a method for producing a supported platinum catalyst.

BACKGROUND ART

In recent years, fuel cells are expected as power sources for mobile objects such as automobiles, and practical use of the fuel cells has already begun. In such fuel cells, expensive noble metal catalysts typified by platinum (Pt) and an alloy containing platinum are generally used. To achieve higher performance fuel cells, it is important to improve the performances of noble metal catalysts.

The activity of oxygen reduction reaction (ORR) is known as one of the performances of the noble metal catalysts. Studies using single crystals of platinum have reported that the ORR activity order of single crystal planes of platinum is Pt (100)<Pt (111)<Pt (110). So far, a method of performing structural control using a polymer to increase the proportion of Pt (110) having high ORR activity has been known (for example, Non-Patent Literature 1). Since Pt (110) indicates a plane direction and is detected as a peak of a Pt (220) plane by X-ray diffraction, increasing the proportion of Pt (110) having high ORR activity is synonymous with increasing the ratio of the diffraction peak intensity of the Pt (220) plane.

CITATION LIST

Patent Literature

Non-Patent Literature 1: Surface Science, Vol. 32, No. 11, pp. 698-703, 2011

SUMMARY OF INVENTION

Technical Problem

The inventors of the present invention considered that the above-described technique in Non-Patent Literature 1 required control of the crystal plane with use of a polymer to increase the ratio of the diffraction peak intensity of the Pt (220) plane in platinum, and had room for further improvement in terms of performance and production.

Furthermore, the inventors of the present invention considered that the improvement in oxidation resistance of a supported platinum catalyst is also important for the extension of the life of a noble metal catalyst.

The present invention has been attained in view of the above problems, and the present invention provides a supported platinum catalyst having a high ratio of a diffraction peak intensity of a Pt (220) plane and having excellent oxidation resistance, by a simple production method without using a polymer, and a technique for utilizing the supported platinum catalyst.

Solution to Problem

The inventors of the present invention have found that causing platinum fine particles to be supported on a specific carbon support with use of a specific reducing agent increases the ratio of the diffraction peak intensity of the Pt (220) plane of the platinum fine particles and achieves excellent oxidation resistance. Consequently, the inventors have accomplished the present invention. That is, the present invention encompasses the following inventions.

<1> A supported platinum catalyst including: a carbon support; and platinum fine particles supported on the carbon support, the platinum fine particles being such that a ratio of a diffraction peak intensity of a (220) plane with respect to a total of diffraction peak intensities of a (111) plane, a (200) plane, and the (220) plane by X-ray diffraction is not less than 0.128, the carbon support having an oxidation reaction temperature of not lower than 620° C.

<2> A supported platinum catalyst including: a carbon support; and platinum fine particles supported on the carbon support, the platinum fine particles being such that a ratio of a diffraction peak intensity of a (220) plane with respect to a total of diffraction peak intensities of a (111) plane, a (200) plane, and the (220) plane by X-ray diffraction is not less than 0.150.

<3> The supported platinum catalyst described in <2> above, wherein the carbon support has an oxidation reaction temperature of not lower than 640° C.

<4> The supported platinum catalyst described in <2> or <3> above, wherein the carbon support has an electrical resistivity of not more than 0.1 Ω·cm.

<5> The supported platinum catalyst described in any one of <1> to <4> above, wherein the carbon support has continuous pores.

<6> The supported platinum catalyst described in any one of <1> to <5> above, wherein the carbon support has a BET specific surface area of 600 m$^2$/g to 2000 m$^2$/g.

<7> The supported platinum catalyst described in any one of <1> to <6> above, wherein the carbon support has a highest peak top in a pore diameter range of 3 nm to 50 nm in a pore distribution in which a horizontal axis represents a pore diameter and a vertical axis represents a logarithmic differential pore volume, by an analysis based on a BJH method.

<8> A cathode for a fuel cell, including the supported platinum catalyst described in any one of <1> to <7> above.

<9> A fuel cell including the cathode for a fuel cell described in <8> above.

<10> A method for producing a supported platinum catalyst, the supported platinum catalyst including: a carbon support; and platinum fine particles supported on the carbon support, the platinum fine particles being such that a ratio of a diffraction peak intensity of a (220) plane with respect to a total of diffraction peak intensities of a (111) plane, a (200) plane, and the (220) plane by X-ray diffraction is not less than 0.128, the method including the step of: reducing a precursor of the platinum fine particles with a reducing agent such that a reduction potential of platinum at pH 7 and at 25° C. is not lower than −0.6 V (vs. SCE), to cause the platinum fine particles to be supported on the carbon support.

<11> The method described in <10> above, wherein the platinum fine particles are such that the ratio of the diffraction peak intensity of the (220) plane with respect to the total of the diffraction peak intensities of the (111) plane, the (200) plane, and the (220) plane by the X-ray diffraction is not less than 0.150.

Advantageous Effects of Invention

According to an aspect of the present invention, it is possible to provide a supported platinum catalyst having a high ratio of a diffraction peak intensity of a Pt (220) plane and having excellent oxidation resistance, by a simple production method without using a polymer, and a technique for utilizing the supported platinum catalyst.

DESCRIPTION OF EMBODIMENTS

Figure 1:
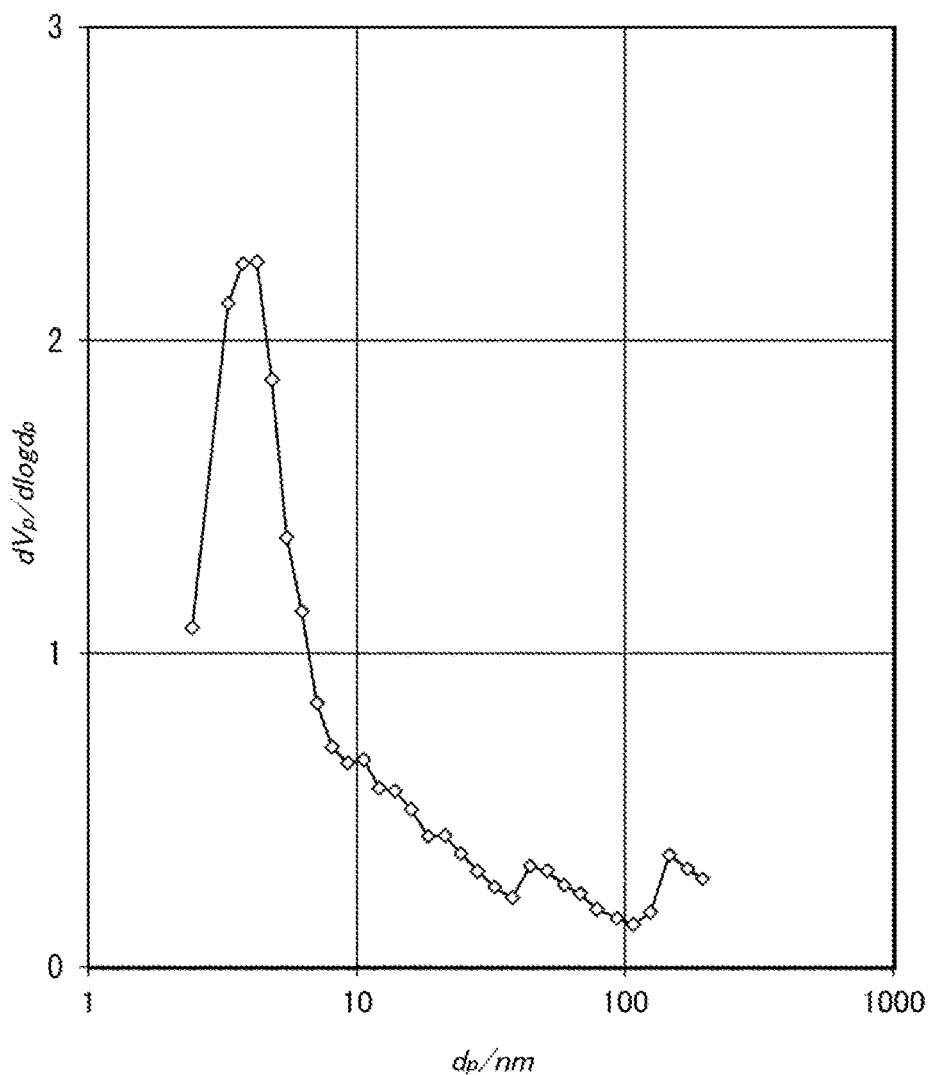
FIG. 1 is a graph showing the results obtained for a carbon support used in Example 1 by performing pore distribution measurement using a gas adsorption method and performing analysis by a BJH method.

The following description will discuss an embodiment of the present invention. The present invention is, however, not limited to the embodiment below. The present invention is not limited to the arrangements described below, but may be altered in various ways within the scope of the claims. Any embodiment and example derived by a proper combination of technical means disclosed in different embodiments and examples are also encompassed in the technical scope of the present invention. Any numerical range expressed as "A to B" in the present specification means "not less than A and not more than B", unless otherwise specified.

[Supported Platinum Catalyst]

A supported platinum catalyst in accordance with an aspect of the present invention includes a carbon support and platinum fine particles supported on the carbon support.

The following will describe the components that constitute the supported platinum catalyst.

[Carbon Support]

In an aspect of the present invention, the carbon support is a porous carbon having mesopores. Note that in the present specification, a hole having a hole diameter of less than 2 nm is referred to as a micropore, a hole having a hole diameter of 2 nm to 50 nm is referred to as a mesopore, and a hole having a hole diameter of more than 50 nm is referred to as a macropore, and these holes are collectively referred to as pores.

It is desirable that the mesopores are open pores, and at least some of the mesopores are continuous pores in which pore portions communicate with each other. Since the mesopores are open pores and have continuous pores, water generated as a catalytic reaction proceeds can be discharged to the outside of the pores without staying inside the pores of the carbon support. This allows the reaction to proceed smoothly. Further, since oxygen can pass through the continuous pores, not only the platinum fine particles supported on the outside of the pores but also the platinum fine particles supported on the inside of the pores can sufficiently contribute to the catalytic reaction. This makes it possible to achieve a high catalyst utilization rate. Thus, it is also possible to reduce the amount of platinum fine particles required to achieve desired catalytic activity.

Further, it is preferable that the carbon support is a porous carbon having mesopores and micropores, and the micropores are formed at positions facing the mesopores in a carbonaceous wall which constitutes an outer wall of the mesopores.

With the micropores included in the carbon support, it is possible to more stably retain the platinum fine particles on the carbon support. Further, with the micropores formed at the positions facing the mesopores, a fuel gas and the like supplied and discharged to the continuous pores of the mesopores are more likely to react with the platinum fine particles.

The pore diameter of the mesopores is preferably 3 nm to 50 nm, and more preferably 3 nm to 10 nm. The mesopores of the pore diameter falling within this range enable the platinum fine particles to be confined within the mesopores. This makes it possible to prevent the platinum fine particles from aggregating with each other and falling off from the carbon support. This has an advantage in that the life of the supported platinum catalyst can be further extended.

A BET specific surface area of the carbon support is preferably 600 $m^2/g$ to 2000 $m^2/g$, and more preferably 600 $m^2/g$ to 1500 $m^2/g$. Further, the total pore volume determined by the BET method is preferably 0.2 ml/g to 3.0 ml/g, and more preferably 0.5 ml/g to 2.6 ml/g. The BET specific surface area and total pore volume falling within these ranges enable formation of a sufficient amount of pores and enable the structure of the continuous pores formed of a carbonaceous material to be satisfactorily maintained.

The oxidation reaction temperature of the carbon support is preferably not lower than 620° C., and more preferably not lower than 630° C. The oxidation reaction temperature falling within this range achieves excellent oxidation resistance and enables suppression of the consumption of the supported platinum catalyst with the progress of the reaction. The oxidation reaction temperature is preferably as high as possible and can be exemplified by, for example, not higher than 700° C., although there is no particular upper limit.

Note that in the present specification, the pore diameter, the BET specific surface area, the total pore volume, and the oxidation reaction temperature are values measured according to the methods described in Examples (described later).

Further, the carbon support may have a random pore structure in which the mesopores are irregularly arranged. Note that the "random pore structure" is intended to mean that the pores are not regularly arranged, and differs, as the pore structure of carbon powder, from the pore structure in which the pores are regularly arranged.

(Carbon Support Having Carbonaceous Wall that Forms Three-Dimensional Network Structure)

In a further aspect of the present invention, the carbon support may be such that the carbonaceous wall constituting the outer wall of the mesopores forms a three-dimensional network structure. Further, the carbon support may have a random pore structure in which the mesopores are irregularly arranged. The carbon support having the carbonaceous wall forming the three-dimensional network structure and the random pore structure is a carbon support having higher strength. The description of the other features of the carbon support having the carbonaceous wall that forms the three-dimensional network structure will be omitted since they are the same as those of the carbon support described above.

(Carbon Support Having Carbonaceous Wall that Forms a Layered Structure)

In a further aspect of the present invention, the carbon support may be such that a part forming a layered structure is further present in the carbonaceous wall constituting the outer wall of the mesopores.

The part forming the layered structure in the carbonaceous wall can be formed through the development of a crystalline material. Note that it is not necessary that all parts of the carbonaceous wall have the layered structure formed of the crystalline material, and an amorphous structure may be present in some part of the carbonaceous wall.

The presence of the part forming the layered structure in the carbonaceous wall of the carbon support can further increase the oxidation reaction temperature of the carbon support. Specifically, the oxidation reaction temperature of the carbon support having the carbonaceous wall forming the layered structure is preferably not lower than 640° C., and can be more preferably not lower than 650° C. In this case as well, the oxidation reaction temperature is preferably as high as possible and can be exemplified by, for example, not higher than 700° C., although there is no particular upper limit.

Further, the presence of the part forming the layered structure in the carbonaceous wall of the carbon support can decrease electrical resistivity of the carbon support. Specifically, the electrical resistivity of the carbon support having the carbonaceous wall that forms the layered structure is preferably not more than 0.1 $\Omega \cdot cm$, and can be more preferably not more than 0.05 $\Omega \cdot cm$. The electrical resistivity of not more than 0.1 $\Omega \cdot cm$, when a cathode for a fuel cell that includes a supported platinum catalyst including such a carbon support is employed in a fuel cell, enables achievement of a high power generation efficiency.

In the present specification, the electrical resistivity is a value measured according to the method described in Examples (described later). The electrical resistivity is preferably as low as possible and can be exemplified by, for example, not less than 0.004 $\Omega \cdot cm$, although there is no particular lower limit.

The description of the other features of the carbon support having the carbonaceous wall that forms the layered structure will be omitted since they are the same as those of the carbon support described above.

Note that it is preferable that the carbon support described above is substantially composed of carbon only. For example, the carbon support preferably does not contain a resin, and in this case, a small amount of an oxide (for example, MgO) and/or a sulfate (for example, $MgSO_4$) may be present in such a carbon support.

[Method for Producing Carbon Support]

In an aspect of the present invention, the carbon support can be produced by a method for producing a carbon support, the method including: a firing step of producing a fired product by firing a mixture containing a carbon source, which is a constituent material of a carbonaceous wall, and a template source of mesopores, or a metal organic acid which serves both as the carbon source and as the template source; and a removing step of removing the template source from the obtained fired product.

As the carbon source which is a constituent material of the carbonaceous wall, a resin can be suitably used. Examples of such a resin include: thermoplastic resins including, for example, polyvinyl alcohol, aliphatic or aromatic polyester resins, polyolefin resins, acrylic resins, styrene resins, polyamide resins, polyacrylonitrile resins, synthetic resins such as elastomers mainly composed of polybutadiene, polyisoprene, or the like, natural rubbers, petroleum resins, and the like; and thermosetting resins including, for example, phenolic resins, furan resins, epoxy resins, alkyd resins, and the like.

Examples of the template source for the mesopores include an oxide. As such an oxide, an oxide of an alkaline earth metal can be suitably used from the viewpoint of, for example, ease of removal in the removal step (described later). Examples of the alkaline earth metal include magnesium, calcium, strontium, barium, and the like. Among these examples, magnesium and calcium are preferable, and magnesium is particularly preferable.

Examples of the metal organic acid include magnesium citrate, magnesium oxalate, calcium citrate, calcium oxalate, and the like. The metal organic acid may be a hydrate or an anhydride thereof.

The firing step can be appropriately performed so that mesopores are formed by carbonization of the carbon source and coating on a sintered template source, and the micropores can be developed at positions facing the mesopores.

As an aspect of the present invention, the firing step is preferably performed in a non-oxidizing atmosphere such as an argon atmosphere or a nitrogen atmosphere, or under a reduced pressure of not more than 133 Pa (1 Torr). Further, a firing temperature is preferably not lower than 500° C., and more preferably 500° C. to 1500° C. A firing time can be determined as appropriate according to materials used, a mixing ratio, other firing conditions, and the like, and is, for example, 0.5 to 3 hours, and more preferably 1 to 3 hours.

The removal step can be performed by immersing a fired product obtained in the above firing step in a template source removal solution to dissolve and remove the template source.

As the template source removal solution, general inorganic acids such as hydrochloric acid, sulfuric acid, nitric acid, and acetic acid, and hot water can be used. To prevent changes in the properties of the carbon support, it is more preferable to use the above-described inorganic acid as a dilute acid of not more than 4 mol/l, or to use hot water of not lower than 80° C. The use of an inorganic acid has an advantage in that a removal speed is increased.

By appropriately selecting the type of the resin as the carbon source, the type and particle diameter of the template source, the mixing ratio of the carbon source and the template source, the type of the metal organic acid, the firing conditions, the template removal conditions, and the like, various physical properties of the carbon support can be controlled to fall within desired ranges. The carbon support produced by the above-described method is a porous carbon having mesopores in a single particle and does not have a structural structure (aggregate structure in which a plurality of particles are fused). Thus, uniform slurry dispersion can be expected during electrode production.

By the above-described production method, it is possible to produce a porous carbon that suppresses a decrease in specific surface area due to carbon shrinkage and retains desired physical properties.

(Method for Producing Carbon Support Having Carbonaceous Wall that Forms Layered Structure)

The carbon support having the carbonaceous wall that forms the layered structure can be produced by, in the above-described carbon support production method, performing the firing step and the removal step, and then further performing a heat treatment step of heat-treating the fired product in which pores are formed.

The heat treatment step is preferably performed in a non-oxidizing atmosphere such as an argon atmosphere or a nitrogen atmosphere, or under a reduced pressure of not more than 133 Pa (1 Torr). Further, a heat treatment temperature is not a problem as long as it is equal to or higher than a temperature at which an amorphous carbon crystallizes, but is preferably not lower than 1000° C., and more preferably 1500° C. to 2200° C., to form (crystallize) the layered structure smoothly and in a short time. Further, a heat treatment time can be determined as appropriate according to materials used, a mixing ratio, other heat treatment conditions, and the like and is, for example, 1 to 3 hours, and more preferably 1 to 2 hours.

By heat-treating the fired product in which the pores are formed, it is possible to produce a carbon support in which a layered structure is formed in whole or in part in the carbonaceous wall, without causing a decrease in the specific surface area.

[Platinum Fine Particles]
(Diffraction Peak Intensity by X-Ray Diffraction)

For example, a ratio of a diffraction peak intensity of a Pt (220) plane of the platinum fine particles can be increased by causing the platinum fine particles to be supported on the carbon support according to a supported platinum catalyst production method which will be described later.

According to platinum fine particles in accordance with an aspect of the present invention, the platinum fine particles supported on the carbon support are such that a ratio of the diffraction peak intensity of the (220) plane with respect to a total of diffraction peak intensities of a (111) plane, a (200) plane, and the (220) plane by X-ray diffraction is not less than 0.128, and more preferably not less than 0.129.

According to platinum fine particles in accordance with an aspect of the present invention, the ratio of the diffraction peak intensity of the Pt (220) plane of the platinum fine particles can be further increased by using, as the carbon support, a carbon support having a carbonaceous wall forming the above-described layered structure. More specifically, the platinum fine particles supported on the carbon support having the carbonaceous wall forming the above-described layered structure are such that the ratio of the diffraction peak intensity of the (220) plane with respect to the total of the diffraction peak intensities of the (111) plane, the (200) plane, and the (220) plane by X-ray diffraction is not less than 0.128, more preferably not less than 0.150, and even more preferably not less than 0.155.

With the platinum fine particles such that the ratio of the diffraction peak intensity of the (220) plane is not less than 0.128, the supported platinum catalyst can exhibit high ORR activity. Note that the ratio of the diffraction peak intensity of the Pt (220) plane of the platinum fine particles described above is preferably as high as possible and can be exemplified by, for example, not more than 0.5, although there is no particular upper limit.

Note that the diffraction peak intensities of the (111) plane, the (200) plane, and the (220) plane by X-ray diffraction are values measured according to the method described in Examples (described later).

(Particle Diameter of Platinum Fine Particles and Amount of Platinum Supported)

The particle diameter of the platinum fine particles supported on the carbon support is preferably less than 10 nm. The particle diameter falling within the above range enables uniform application of the supported platinum catalyst during electrode production. Note that the particle diameter of the platinum fine particles is an average value of longer diameters of 20 or more particles measured using a transmission electron microscope (TEM).

The amount of platinum supported on the carbon support is not particularly limited, and can be set as appropriate according to the ORR activity of the platinum fine particles, the use, and the like.

Note that the particle diameter of the platinum fine particles and the amount of platinum supported can be controlled by appropriately selecting various conditions such as the type of a precursor of the platinum fine particles used in the production of the supported platinum catalyst and the mass ratio with respect to the carbon support.

[Method for Producing Supported Platinum Catalyst]

The supported platinum catalyst can be produced by a production method including a step of reducing a precursor of platinum fine particles with a specific reducing agent to cause the platinum fine particles to be supported on the carbon support described above.

The above step can be suitably performed by a conventional method in which a carbon support and platinum fine particles are brought into contact with each other so that the platinum fine particles are supported on the carbon support. Specifically, the carbon support is immersed in a platinum solution containing the precursor of the platinum fine particles and a solvent, and the reducing agent is added to the obtained mixture to carry out a reduction reaction, so that the platinum fine particles can be supported on the carbon support.

Examples of the precursor of the platinum fine particles include platinum powder and platinum-containing compounds including platinum (II) chloride, platinum (IV) chloride, platinum (IV) chloride acid, platinum (IV) oxide, diamminedinitro platinum (II), dichlorotetraammine platinum (II), hexahydroxoplatinate (IV), potassium tetrachloroplatinate (II), potassium tetrachloroplatinate (IV), and the like. These platinum-containing compounds may be used singly or in combination of two or more thereof.

As the reducing agent can be used a reducing agent having a reducing power such that a reduction potential of platinum at pH 7 and at 25° C. is not lower than −0.6 V (vs. SCE), and more preferably not lower than −0.55 V (vs. SCE). With the reducing agent of the reduction potential falling within such a range, the ratio of the diffraction peak intensity of the Pt (220) plane of the platinum fine particles can be increased.

Specific examples of the reducing agent suitably used in the present invention include formaldehyde and sodium hypophosphite.

Note that in the present invention, the reducing agent is the one in a solid or liquid state.

Examples of the solvent include water. Further, the solvent may contain a pH adjuster such as sodium carbonate, if necessary.

In the above-described platinum solution, the amount of the solvent added can be determined as appropriate by a person skilled in the art to fall within such a range that the precursor of the platinum fine particles can be dissolved to form a stable platinum complex.

Further, in the above mixture, the amount of the reducing agent added is preferably 1.0 to 1.1 times the molar amount of the precursor of the platinum fine particles.

The immersion temperature and the immersion time can be set as appropriate according to the types of the carbon support and the precursor of the platinum fine particles, the concentration, and the like. For example, the immersion temperature is 60° C. to 90° C., and more preferably 70° C. to 85° C., and the immersion time is 0.5 hours to 3 hours, and more preferably 1 hour to 2 hours.

The reaction temperature of the reduction reaction and the reaction time thereof can be set as appropriate according to the type of the reducing agent, the amount of the reducing agent added, and the like. For example, the reaction temperature is 60° C. to 90° C., and more preferably 70° C. to 85° C., and the reaction time is 1 hour to 5 hours, and more preferably 3 hours to 4 hours.

After the above reduction reaction, if necessary, filtration, washing, drying, and/or other treatment can be performed to obtain a supported platinum catalyst in accordance with an embodiment of the present invention.

Note that the carbon support in the obtained supported platinum catalyst preferably has the properties of the carbon support described above.

[Preferable Use]

The supported platinum catalyst in accordance with an embodiment of the present invention exhibits excellent ORR activity and excellent oxidation resistance under the operating environment of a fuel cell. Thus, the supported platinum catalyst in accordance with an embodiment of the present invention can be suitably used for a cathode for a fuel cell.

The above-described cathode for a fuel cell can be employed in various fuel cells. Examples of such fuel cells include a solid polymer electrolyte fuel cell (PEFC).

EXAMPLES

In Examples below, various physical properties of the carbon support were measured by the following methods.

(Pore Diameter of Mesopores of Carbon Support)

The pore diameter of the mesopores of the carbon support was measured using the BJH (Barrett-Joyner-Halenda) method. Specifically, in the pore distribution (the horizontal axis represents a pore diameter, and the vertical axis represents a logarithmic differential pore volume ($dV_p/d \log d_p$)) obtained based on the BJH method, the pore diameter at which the highest peak top is located was determined to be the pore diameter of the mesopores.

(BET Specific Surface Area and Total Pore Volume of Carbon Support)

Using nitrogen as an adsorption gas, measurement at 77K (−196° C.) was performed to determine a nitrogen adsorption isotherm. For the measurement, an automatic gas/vapor adsorption amount measuring device BELSORP-MAX manufactured by BEL JAPAN, Inc. was used. The BET specific surface area was calculated from the measurement points at a relative pressure ($P/P_0$)=0.05 to 0.20. The total pore volume was determined from the amount of adsorption at a relative pressure ($P/P_0$)=0.95.

(Micropore Volume and Mesopore Volume of Carbon Support)

The micropore volume was calculated using the DA (Dubinin-Astakhov) method. The mesopore volume was determined by subtracting the micropore volume from the total pore volume.

Example 1

First, trimagnesium dicitrate anhydride [$Mg_3(C_6H_5O_7)_2$], which serves as both a carbon source and a template source, was prepared and was heat-treated at 900° C. for 1 hour in a nitrogen atmosphere. As a result, a fired product was obtained having magnesium oxide as template particles and having a carbonaceous wall. Next, the obtained fired product was washed with a 30 wt % sulfuric acid solution to completely elute magnesium oxide, so that a porous carbon was obtained having a large number of mesopores, having a carbonaceous wall constituting the outer wall of the mesopores and forming a three-dimensional network structure, and having a random pore structure. Then, the obtained porous carbon was pulverized using a planetary bead mill for 1.5 hours under the condition of a rotation speed of 120 rpm to adjust the median diameter to 2 μm to 4 μm, and a carbon support substantially composed of carbon only was produced. Note that alumina beads having a diameter of 5 mm were used as beads.

FIG. 1 shows the results obtained for the carbon support thus obtained, by performing pore distribution measurement using a gas adsorption method and performing analysis by the BJH method. From FIG. 1, it can be confirmed that the carbon support obtained above has the highest peak top at a pore diameter of 4 nm in the pore distribution in which the horizontal axis represents the pore diameter and the vertical axis represents the logarithmic differential pore volume ($dV_p/d \log d_p$), by the analysis based on the BJH method.

0.225 g of the above-described carbon support, 0.12 g of chloroplatinic acid (IV) and 0.13 g of sodium carbonate were mixed in 100 mL of ultrapure water, and a mixture was stirred for 1 hour in a state of being warmed to 80° C. Next, the mixture was stirred while 20 mL of an aqueous solution of 0.07 mol/L formaldehyde (reduction potential of platinum at pH 7 and at 25° C. was −0.52) was dropped at a constant rate over 5 minutes. Further, the mixture was stirred for 4 hours while the temperature of 80° C. was maintained. The obtained stirred liquid was filtered, and a solid content was vacuum-dried and further heat-treated at 120° C. in a nitrogen atmosphere, so that black powder was obtained as a supported platinum catalyst. Note that the carbon support in the supported platinum catalyst thus obtained was the one having a large number of mesopores, having a carbonaceous wall constituting the outer wall of the mesopores and forming a three-dimensional network structure, having a random pore structure, and being substantially composed of carbon only.

Example 2

A porous carbon produced in the same manner as in Example 1 was further heat-treated at 1800° C. for 1 hour in a nitrogen atmosphere. The obtained porous carbon had a large number of mesopores, had a carbonaceous wall constituting the outer wall of the mesopores and forming a three-dimensional network structure, had a random pore structure, and further had a part forming a layered structure in the carbonaceous wall. The obtained porous carbon was pulverized using a planetary bead mill in the same manner as in Example 1, and a carbon support substantially composed of carbon only having a carbonaceous wall forming a layered structure was obtained.

With use of the carbon support obtained above, black powder was obtained as a supported platinum catalyst in the same manner as in Example 1. Note that the carbon support in the obtained supported platinum catalyst was the one having a large number of mesopores, having a carbonaceous wall constituting the outer wall of the mesopores and forming a three-dimensional network structure, having a random pore structure, further having a part forming a layered structure in the carbonaceous wall, and being substantially composed of carbon only.

Comparative Example 1

VULCAN (registered trademark) XC-72 (manufactured by CABOT; having no continuous pores and having a structural structure) was subjected to ultrasonic dispersion treatment at room temperature for 10 minutes to produce a carbon support.

With use of the carbon support obtained above, black powder was obtained as a supported platinum catalyst in the same manner as in Example 1.

hydroxide of platinum to be deposited on the carbon support. The obtained stirred liquid was filtered, and a solid content was vacuum-dried and further heat-treated at 300° C. for 3 hours in an atmosphere of 50% $H_2$ and 50% argon to obtain a supported platinum catalyst. The amount of platinum supported was 30 wt % with respect to the carbon support. Note that in the above-described platinum growth method, no reducing agent is used.

Comparative Example 4

A supported platinum catalyst was obtained in the same manner as in Comparative Example 3 except that the amount of platinum supported was 40 wt % with respect to the carbon support.

Comparative Example 5

A supported platinum catalyst was obtained in the same manner as in Comparative Example 3 except that the amount of platinum supported was 50 wt % with respect to the carbon support.

The physical properties of the carbon supports used in Examples 1 and 2 and Comparative Examples 1 to 5 are summarized in Table 1 below.

TABLE 1

| | Physical properties of carbon support | | | | | |
|---|---|---|---|---|---|---|
| | BET specific surface area [$m^2$/g] | Total pore volume [mL/g] | Micropore volume [mL/g] | Mesopore volume [mL/g] | Pore diameter of mesopores [nm] | Presence or absence of continuous pores |
| Example 1 | 1438 | 1.48 | 0.518 | 0.962 | 4 | o |
| Example 2 | 941 | 1.17 | 0.319 | 0.851 | 4 | o |
| Comparative Example 1 | 237 | 0.29 | 0.096 | 0.194 | 174 | x |
| Comparative Example 2 | 1339 | 1.79 | 0.475 | 1.315 | 125 | x |
| Comparative Example 3 | 941 | 1.17 | 0.319 | 0.851 | 4 | o |
| Comparative Example 4 | 941 | 1.17 | 0.319 | 0.851 | 4 | o |
| Comparative Example 5 | 941 | 1.17 | 0.319 | 0.851 | 4 | o |

Comparative Example 2

Ketjen Black EC300J (manufactured by Lion Specialty Chemicals Co., Ltd.; having no continuous pores and having a structural structure) was subjected to ultrasonic dispersion treatment at room temperature for 10 minutes to produce a carbon support.

With use of the carbon support obtained above, black powder was obtained as a supported platinum catalyst in the same manner as in Example 1.

Comparative Example 3

As a carbon support, the carbon support used in Example 2 was prepared.

The above-described carbon support was dispersed in ultrapure water to obtain a dispersion liquid. Meanwhile, potassium tetrachloroplatinate (II) was dissolved in ultrapure water to obtain a platinum solution. The platinum solution was added to the above-described dispersion liquid and mixed, a 0.1 M sodium hydroxide aqueous solution was added to the obtained mixture to adjust a pH to 8, and the mixture was stirred at 70° C. for 1 hour. This caused a

[Confirmation of Supported Platinum Catalyst]

The black powders obtained in Examples 1 and 2 and Comparative Examples 1 to 5 were each dissolved in aqua regia, platinum was quantified using the ICP-AES analysis method, and the amount of platinum supported by the black powder was calculated from the concentration obtained by the quantification.

Further, each black powder was observed using a transmission electron microscope (TEM, manufactured by JEOL Ltd.; JEM-2100) at an observation magnification of 500,000 times, and it was confirmed that in each black powder, platinum fine particles (1 nm to 5 nm in diameter) were dispersed and supported on the carbon support.

[Measurement of Ratio of Diffraction Peak Intensity of Pt (220) Plane]

Regarding the supported platinum catalysts obtained in Examples 1 and 2 and Comparative Examples 1 and 3 to 5, the diffraction peak intensities by X-ray diffraction were measured in the following manner, and respective ratios of diffraction peak intensities of a (111) plane, a (200) plane, and a (220) plane were calculated with respect to the total of the diffraction peak intensities of the (111) plane, the (200) plane, and the (220) plane.

The peak separation of the diffraction peak was performed using Multipeak fitting2 attached to Igor Pro 6.36J. The baseline was analyzed using the Cubic formula, and the separation of each peak was analyzed using the Voigt formula, and the diffraction peak intensity of each peak was determined from the height of each peak.

Figure 2:
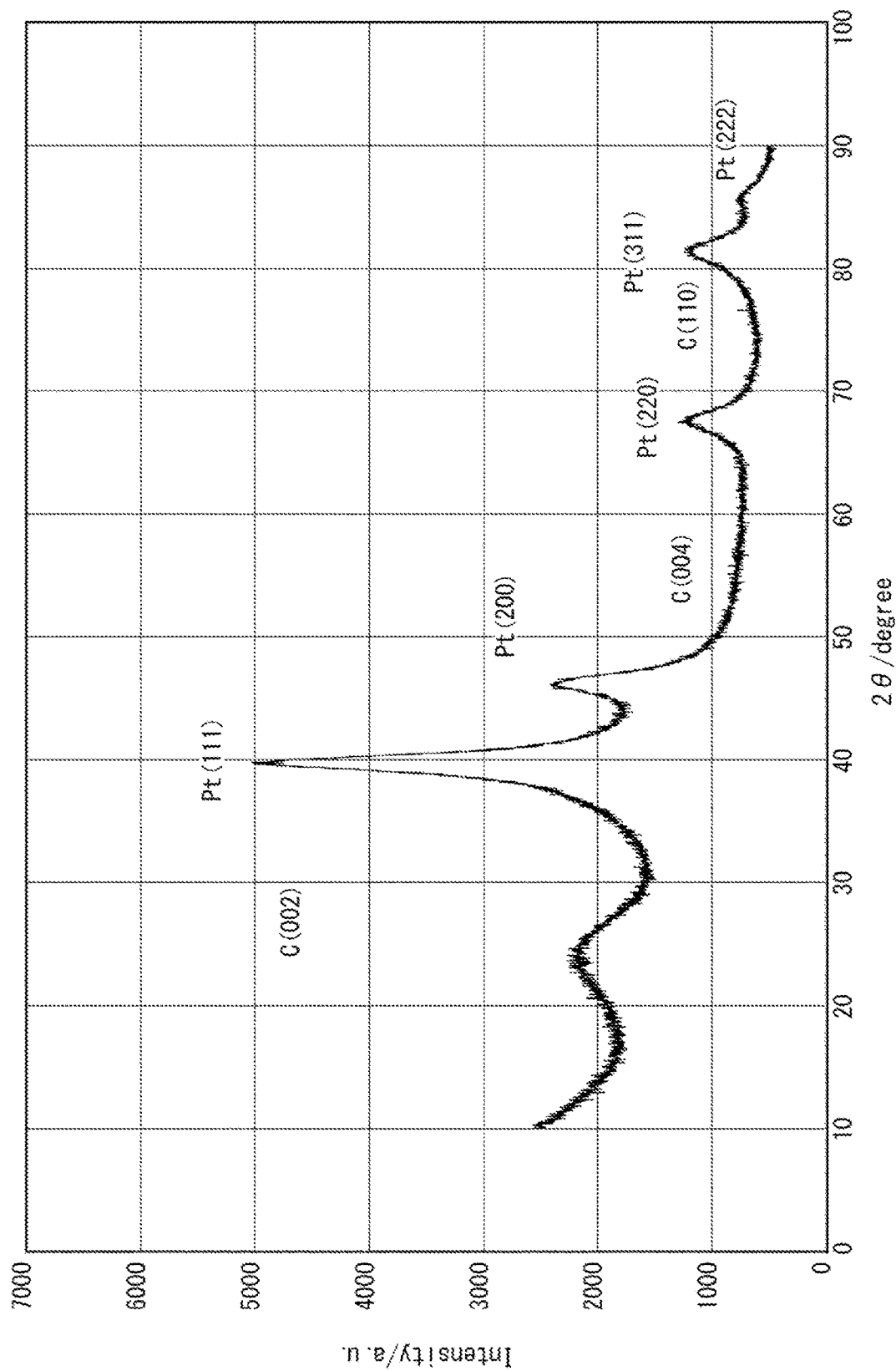
FIG. 2 is an X-ray diffraction diagram (XRD diagram) of a supported platinum catalyst obtained in Example 1.
Figure 3:
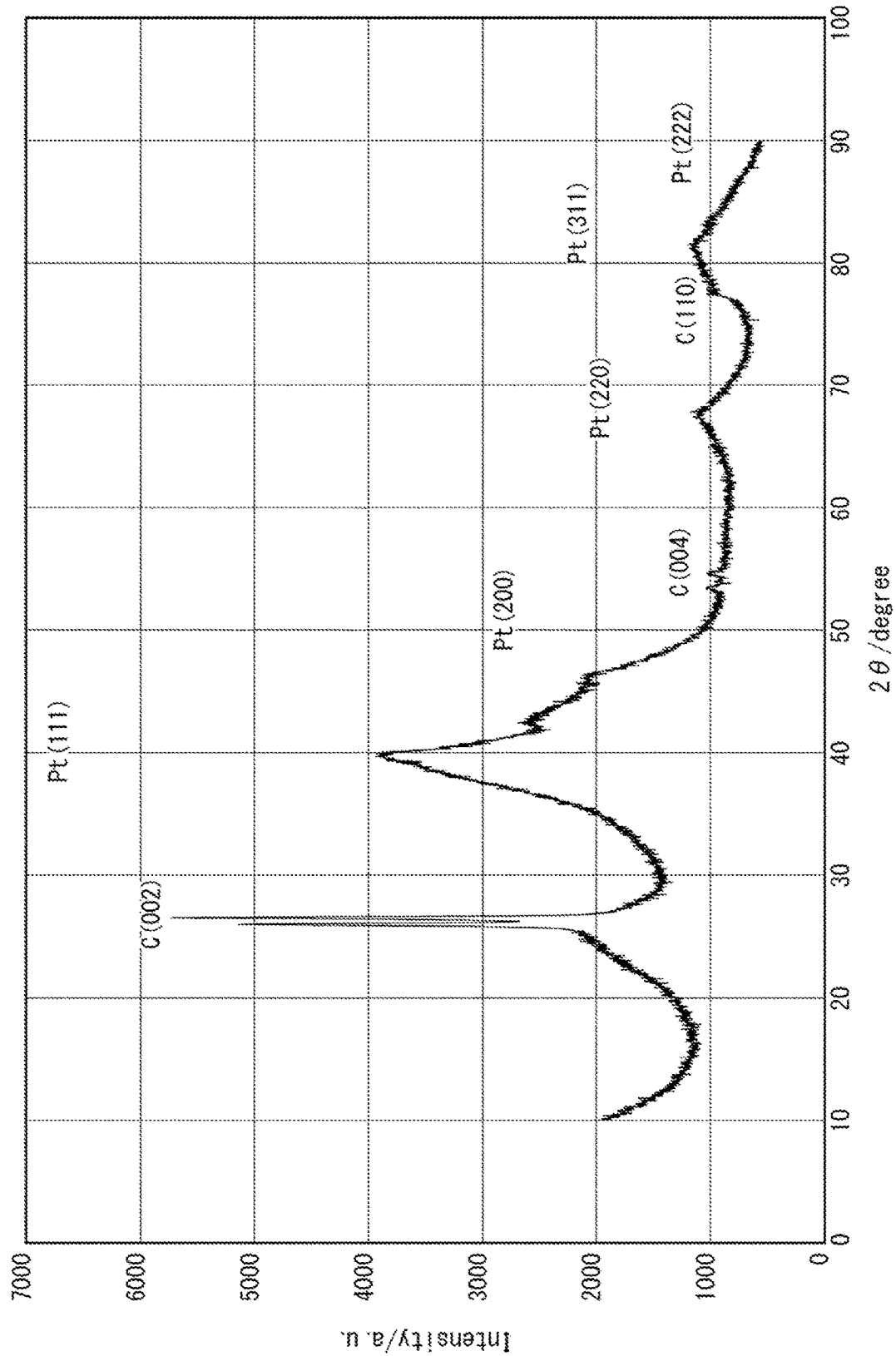
FIG. 3 is an X-ray diffraction diagram (XRD diagram) of a supported platinum catalyst obtained in Example 2.
Figure 4:
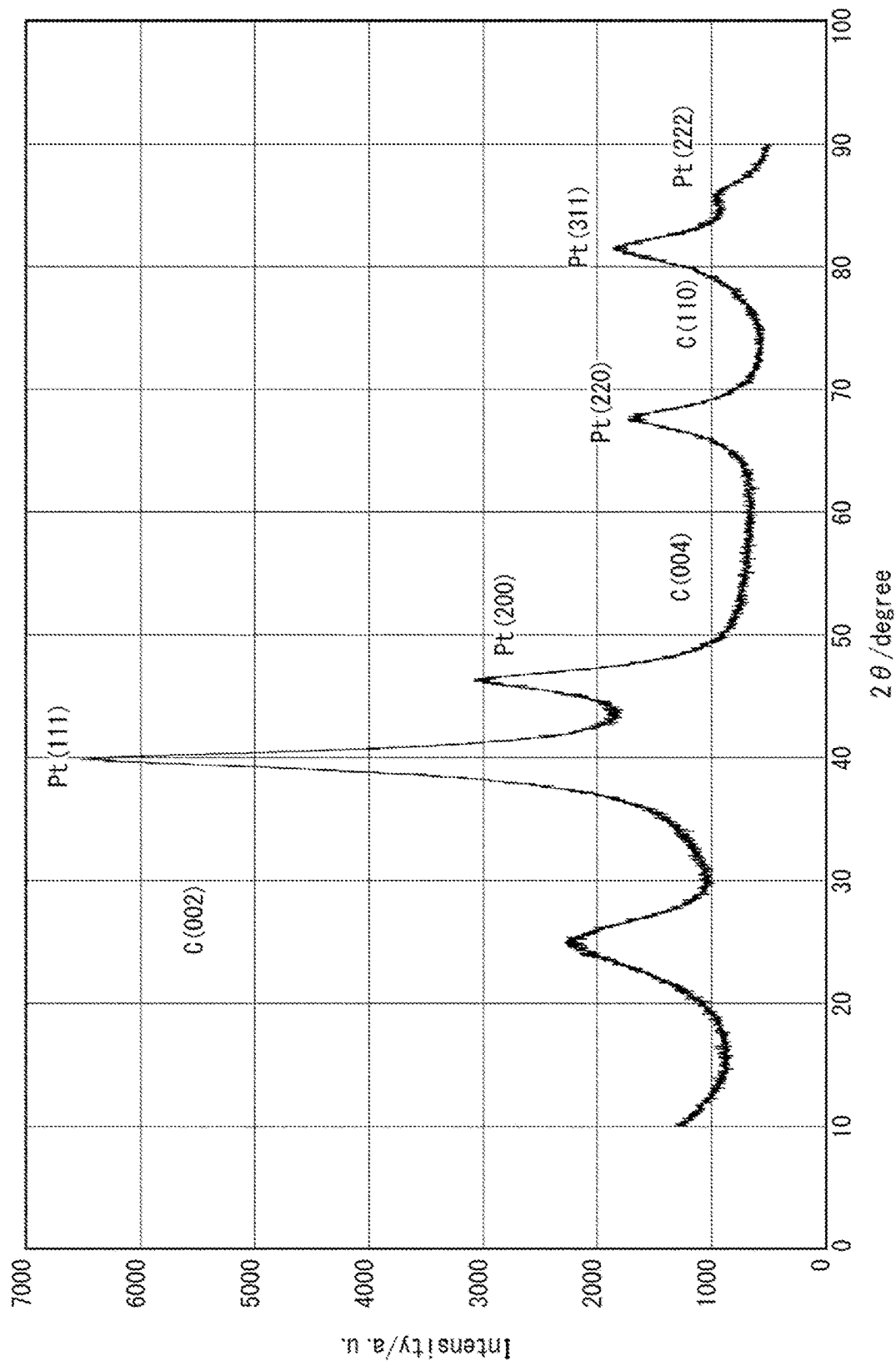
FIG. 4 is an X-ray diffraction diagram (XRD diagram) of a supported platinum catalyst obtained in Comparative Example 1.

FIGS. 2 to 4 are X-ray diffraction diagrams (XRD diagrams) of the supported platinum catalysts obtained in Examples 1 and 2 and Comparative Example 1.

[Evaluation of Oxidation Resistance]

Regarding the carbon supports used in Examples 1 and 2 and Comparative Examples 1 to 5, the oxidation reaction temperature was measured in the following manner.

The carbon support was heated from room temperature to 900° C. at 5° C./min in an air atmosphere, the relationship between the carbon support mass and the temperature was determined. From the obtained graph (the horizontal axis represents the temperature, and the vertical axis represents the carbon support mass), the temperature was calculated at the intersection of a virtual extension line of the portion where almost no change occurred in the mass (the portion substantially parallel to the horizontal axis) and a virtual extension line of the portion where a remarkable change occurred in the mass.

Figure 5:
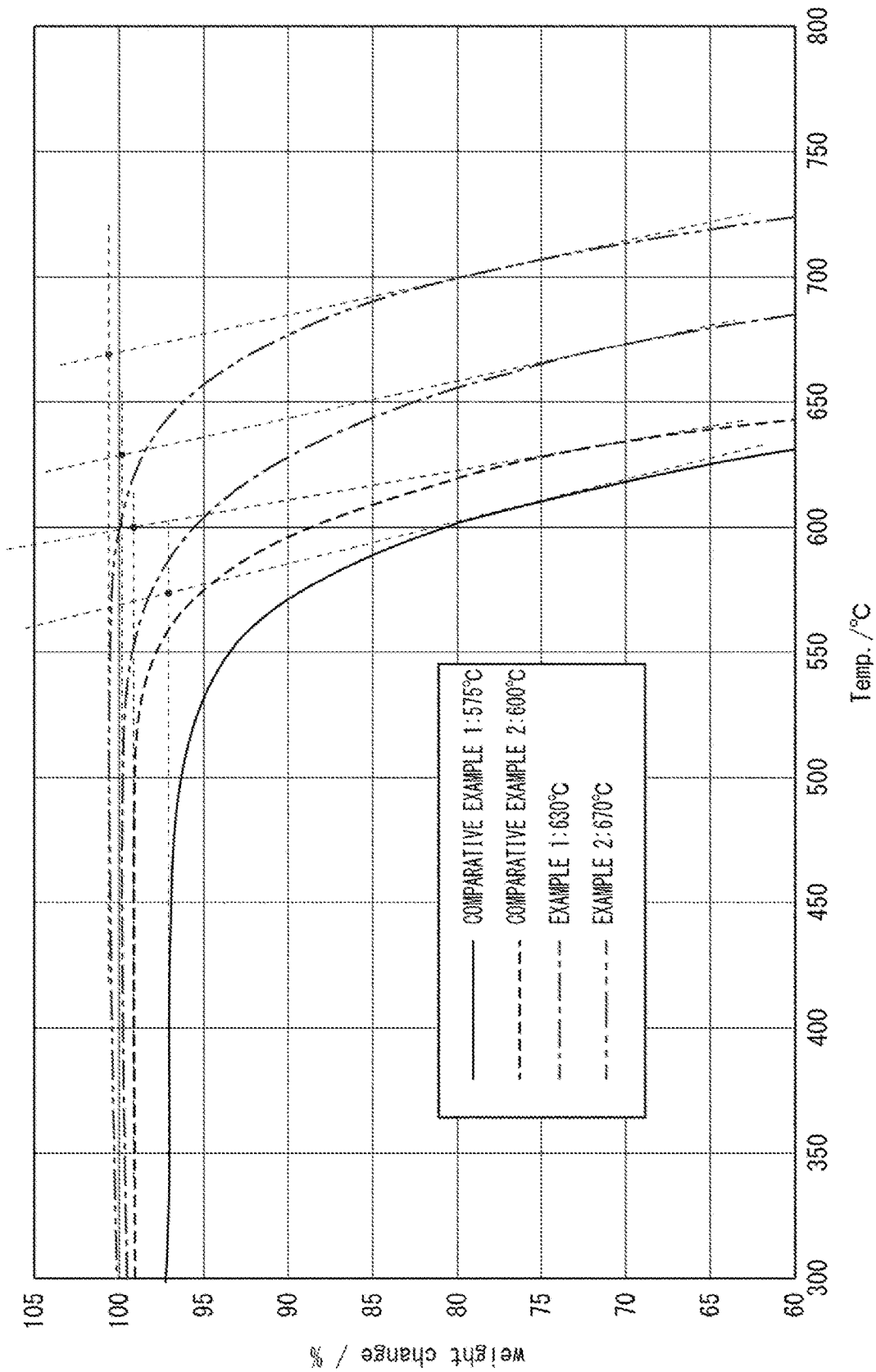
FIG. 5 is a graph showing a carbon support mass-temperature relationship for the carbon supports used in Examples 1 and 2 and Comparative Examples 1 and 2.

FIG. 5 is a graph showing a carbon support mass-temperature relationship for the carbon supports used in Examples 1 and 2 and Comparative Examples 1 and 2.

[Measurement of Electrical Resistivity]

The carbon supports used in Examples 1 and 2 and Comparative Examples 2 to 5 were pressurized to 40 MPa using a powder resistance system MCP-51 type (manufactured by Mitsubishi Chemical Analytech Co., Ltd.), and then measurement was performed using the resistivity meter Loresta GP by the constant current application four-probe method.

[Evaluation of ORR Activity]

(Preparation of Electrodes)

Using the supported platinum catalysts obtained in Examples 1 and 2 and Comparative Examples 1 to 5, electrodes were produced in the following manner according to the method described in Taro Kinumoto, Hirohisa Yamada, Electrochemistry and Industrial Physical Chemistry, Vol. 79 (2), pp. 116-121 (2011).

A predetermined amount of supported platinum catalyst (1.5 µg as platinum mass) approximately calculated from the amount of platinum supported, 0.625 mL of ultrapure water, and 5.625 mg of ethanol were mixed, and a mixture was subjected to dispersion treatment for 30 minutes while being ice-cooled using an ultrasonic cleaner. 10.0 µL of this dispersion liquid was applied onto a glassy carbon disc electrode (5 mm in diameter) using a micropipette and was dried at 60° C. for 10 minutes using a blower dryer. Next, 0.10 mL of a 5% Nafion (registered trademark) dispersion liquid (manufactured by Sigma-Aldrich) and 4.90 mL of 2-propanol were mixed, and 3.69 µL of a resultant mixture was applied onto the disc electrode using a micropipette and was dried at 60° C. for 1 minute using a blower dryer to obtain an electrode.

(Calculation of Platinum Mass Activity (ORR Activity))

Regarding the supported platinum catalysts obtained in Examples 1 and 2 and Comparative Examples 1 to 5, platinum mass activity (ORR activity) under the operating environment of a fuel cell was calculated in the following manner according to the calculation method described in Taro Kinumoto, Hirohisa Yamada, Electrochemistry and Industrial Physical Chemistry, Vol. 79(2), pp. 116-121 (2011).

A half cell was prepared in which the electrode obtained above was used as an working electrode, a platinum mesh was used as a counter electrode, a reversible hydrogen electrode was used as a reference electrode, and a nitrogen-saturated 0.1 M perchloric acid aqueous solution was used as an electrolyte. The electrolyte was bubbled with nitrogen for 1 hour. The half cell was subjected to 100 cycles of cyclic voltammetry measurement under the conditions of 25° C., 0.05 V to 1.20 V, and 0.05 V/s.

The amount of hydrogen adsorption electricity (unit: C) was obtained by integrating a reduction current value in the range of 0.05 V to 0.40 V with respect to a reduction current value at 0.40 V among current values at the time of cathode sweep in the 100th cycle. A platinum surface area (unit: $m^2$) was approximately calculated by dividing the amount of hydrogen adsorption electricity by the theoretical area equivalent amount of electricity for hydrogen adsorption with respect to platinum (2.10 $C/m^2$).

Further, to obtain the ORR activity of the same electrode (working electrode), a half cell was prepared in which a platinum mesh was used as a counter electrode, a reversible hydrogen electrode was used as a reference electrode, and an oxygen-saturated 0.1 M perchloric acid aqueous solution was used as an electrolyte. The electrolyte was bubbled with oxygen for 3 hours. Further, with the working electrode rotated at 400 rpm, 625 rpm, 900 rpm, 1225 rpm, and 1600 rpm, an electrical potential was swept with respect to the half cell from a negative direction to a positive direction at a rate of 0.01 V/S at 25° C. and in the range of 0.05 V to 0.1 V. An activation dominant current was determined from the Koutecky-Levich plot using a current value at 0.9 V in a current-potential curve obtained at each rotation speed. From the approximately calculated platinum surface area and activation dominant current, specific activity was calculated, and the platinum mass activity (A/g) was calculated by converting the specific activity to activity per platinum catalyst mass.

The results obtained above are shown in Table 2 below.

TABLE 2

| | Proportions | | | Oxidation reaction temperature [° C.] | Electrical resistivity [Ω · m] | ORR activity [A/g] |
| --- | --- | --- | --- | --- | --- | --- |
| | Pt (111) | Pt (200) | Pt (220) | | | |
| Example 1 | 0.669 | 0.202 | 0.129 | 630 | 0.53 | 340 |
| Example 2 | 0.610 | 0.235 | 0.155 | 670 | 0.04 | 440 |
| Comparative Example 1 | 0.625 | 0.239 | 0.136 | 575 | — | 390 |
| Comparative Example 2 | 0.668 | 0.209 | 0.123 | 600 | 0.03 | 340 |
| Comparative Example 3 | 0.650 | 0.237 | 0.113 | 670 | 0.04 | 295 |
| Comparative Example 4 | 0.545 | 0.210 | 0.120 | 670 | 0.04 | 191 |
| Comparative Example 5 | 0.532 | 0.211 | 0.127 | 670 | 0.04 | 209 |

As shown in Table 2, when Examples 1 and 2 and Comparative Examples 1 and 2 were compared, it was found that Examples 1 and 2 had high oxidation reaction temperatures and excellent oxidation resistance. Further, comparison between Examples 1 and 2 and Comparative Examples 3 and 5 showed that in Examples 1 and 2 in which reduction was performed by the reducing agent such that the reduction potential of platinum at pH 7 and at 25° C. is not lower than −0.6 V (vs. SCE), the ratio (Pt(220)) of the diffraction peak intensity of the (220) plane of the platinum fine particles was not lower than 0.128, and the ORR activity was high.

In general, a porous carbon having no structural structure has higher electrical resistivity than a carbon support having a structural structure. However, as shown in Table 2, the carbon support used in Example 2 had electrical resistivity which is equivalent to that of the carbon support of Comparative Example 2 having the structural structure, even though the carbon support used in Example 2 had no structural structure.

INDUSTRIAL APPLICABILITY

A supported platinum catalyst in accordance with an embodiment of the present invention can be suitably used for a cathode for a fuel cell.

The invention claimed is:

1. A supported platinum catalyst comprising:
a carbon support; and
platinum fine particles supported on the carbon support, the platinum fine particles being such that a ratio of a diffraction peak intensity of a (220) plane with respect to a total of diffraction peak intensities of a (111) plane, a (200) plane, and the (220) plane by X-ray diffraction is not less than 0.128,
the carbon support having an oxidation reaction temperature of not lower than 620° C.

2. The supported platinum catalyst according to claim 1, wherein the carbon support has continuous pores.

3. The supported platinum catalyst according to claim 1, wherein the carbon support has a BET specific surface area of 600 $m^2/g$ to 2000 $m^2/g$.

4. The supported platinum catalyst according to claim 1, wherein the carbon support has a highest peak top in a pore diameter range of 3 nm to 50 nm in a pore distribution in which a horizontal axis represents a pore diameter and a vertical axis represents a logarithmic differential pore volume, by an analysis based on a BJH method.

5. A cathode for a fuel cell, comprising the supported platinum catalyst according to claim 1.

6. A fuel cell comprising the cathode for a fuel cell according to claim 5.

7. A supported platinum catalyst comprising:
a carbon support; and
platinum fine particles supported on the carbon support, the platinum fine particles being such that a ratio of a diffraction peak intensity of a (220) plane with respect to a total of diffraction peak intensities of a (111) plane, a (200) plane, and the (220) plane by X-ray diffraction is not less than 0.150.

8. The supported platinum catalyst according to claim 7, wherein the carbon support has an oxidation reaction temperature of not lower than 640° C.

9. The supported platinum catalyst according to claim 7, wherein the carbon support has an electrical resistivity of not more than 0.1 Ω·cm.

10. The supported platinum catalyst according to claim 7, wherein the carbon support has continuous pores.

11. The supported platinum catalyst according to claim 7, wherein the carbon support has a BET specific surface area of 600 $m^2/g$ to 2000 $m^2/g$.

12. The supported platinum catalyst according to claim 7, wherein the carbon support has a highest peak top in a pore diameter range of 3 nm to 50 nm in a pore distribution in which a horizontal axis represents a pore diameter and a vertical axis represents a logarithmic differential pore volume, by an analysis based on a BJH method.

13. A cathode for a fuel cell, comprising the supported platinum catalyst according to claim 7.

14. A fuel cell comprising the cathode for a fuel cell according to claim 13.

15. A method for producing a supported platinum catalyst, the supported platinum catalyst comprising: a carbon support; and platinum fine particles supported on the carbon support,
the platinum fine particles being such that a ratio of a diffraction peak intensity of a (220) plane with respect to a total of diffraction peak intensities of a (111) plane, a (200) plane, and the (220) plane by X-ray diffraction is not less than 0.128,
the method comprising the step of:
reducing a precursor of the platinum fine particles with a reducing agent such that a reduction potential of platinum at pH 7 and at 25° C. is not lower than −0.6 V vs. SCE, to cause the platinum fine particles to be supported on the carbon support.

16. The method according to claim 15, wherein the platinum fine particles are such that the ratio of the diffraction peak intensity of the (220) plane with respect to the total of the diffraction peak intensities of the (111) plane, the (200) plane, and the (220) plane by the X-ray diffraction is not less than 0.150.

* * * * *